United States Patent [19]
Kothmann et al.

[11] Patent Number: 5,094,702
[45] Date of Patent: Mar. 10, 1992

[54] MENU DRIVEN HEAT TREATMENT CONTROL OF THIN WALLED BODIES

[75] Inventors: Richard E. Kothmann, Churchill Boro; Russell R. Booth, Jr., Elizabeth Twp.; Noel P. Grimm, Monroeville; Abram Batenburg, Greensburg; Vaughn M. Thomas, Allison Park, all of Pa.

[73] Assignee: U.S. Dept. of Energy, Washington, D.C.

[21] Appl. No.: 368,457

[22] Filed: Jun. 19, 1989

[51] Int. Cl.⁵ .................. C21D 11/00; C21D 9/56
[52] U.S. Cl. ....................... 148/128; 148/134; 266/111; 266/156
[58] Field of Search ............... 148/120, 134; 266/111, 266/156

[56] References Cited

U.S. PATENT DOCUMENTS

| | | | |
|---|---|---|---|
| 4,401,484 | 8/1983 | Yoshimoto et al. | 148/131 |
| 4,475,963 | 10/1984 | Takahashi et al. | 148/128 |
| 4,606,529 | 8/1986 | Tooch | 148/128 |
| 4,773,949 | 9/1988 | Yamaguchi et al. | 148/128 |
| 4,816,089 | 3/1989 | Cheng et al. | 148/128 |

FOREIGN PATENT DOCUMENTS

| | | | |
|---|---|---|---|
| 2050407 | 3/1987 | Japan | 148/128 |
| 2280323 | 12/1987 | Japan | 148/128 |

*Primary Examiner*—Upendra Roy

[57] ABSTRACT

A process for controlling the heating of a thin-walled body according to a predetermined temperature program by means of electrically controllable heaters, comprising: disposing the heaters adjacent one surface of the body such that each heater is in facing relation with a respective zone of the surface;

supplying heat-generating power to each heater and monitoring the temperature at each surface zone; and for each zone:

deriving (16,18,20), on the basis of the temperature values obtained in the monitoring step, estimated temperature values of the surface at successive time intervals each having a first selected duration;

generating (28), on the basis of the estimated temperature values derived in each time interval, representations of the temperature, THSIFUT, which each surface zone will have, based on the level of power presently supplied to each heater, at a future time which is separated from the present time interval by a second selected duration;

determining (30) the difference between THSIFUT and the desired temperature, FUTREFTVZL, at the future time which is separated from the present time interval by the second selected duration;

providing (52) a representation indicating the power level which sould be supplied to each heater in order to reduce the difference obtained in the determining step; and adjusting the power level supplied to each heater by the supplying step in response to the value of the representation provided in the providing step.

15 Claims, 4 Drawing Sheets

MENU DRIVEN HEAT TREATMENT CONTROL OF THIN WALLED BODIES

This invention was made under government contract, and the Federal Government may have rights in the subject invention.

CROSS REFERENCE TO RELATED APPLICATIONS

The following applications disclose subject matter which is related to the present invention. All of these applications were filed on June 19, 1989.

MODULAR ANNEALING APPARATUS FOR IN SITU REACTOR VESSEL ANNEALING AND RELATED METHOD OF ASSEMBLY—Ser. No. 07/368,454

WATER FILLED TANKS FOR TEMPORARY SHIELDING OF REACTOR VESSEL INTERNALS AND METHOD OF ASSEMBLY—Ser. No. 07/368,433

COFFER DAM FOR TEMPORARY SHIELDING OF REACTOR VESSEL INTERNALS AND METHOD OF ASSEMBLY—Ser. No. 07/368,635

REACTOR VESSEL ANNEALING SYSTEM—Ser. NO. 07/368,456

ANNEALING UNIT INSERTION AND REMOVAL SYSTEM—Ser. No. 07/368,503

HEATING EQUIPMENT INSTALLATION SYSTEM AND METHOD—Ser. No. 368,495

TEMPERATURE MONITORING DEVICE AND THERMOCOUPLE ASSEMBLY THEREFOR—Ser. No. 07/368,432

ELECTRIC RESISTANCE HEATER UNIT ASSEMBLY—Ser. No. 07/368,432

REACTOR VESSEL NOZZLE THERMAL BARRIER—Ser. No. 07/368,738

MONITORING AND CONTROL OF REACTOR VESSEL HEAT TREATMENT—Ser. No. 07/368,433

SHIPPING DEVICE FOR HEATER UNIT ASSEMBLY—Ser. No. 07/368,498

THERMAL SIMULATION PROCESS—Ser. No. 07/368,490.

BACKGROUND OF THE INVENTION

The present invention relates to a procedure for controlling a heat treatment, particularly for annealing embrittled reactor vessels.

During the normal operation of a nuclear reactor, the reactor vessel, which is normally made of steel and which houses a core containing nuclear fuel, is exposed to intense radiation. Experience has shown that this radiation causes changes in the fine grain structure of the steel walls of the vessel. These structural changes make the walls brittle, a problem commonly referred to as reactor vessel embrittlement. Embrittlement reduces the flexibility of the vessel wall and increases the susceptibility of the vessel wall to fracturing, particularly if subjected to sudden stresses, such as due to operating transients and pressurized thermal shock events.

Because of this embrittlement phenomenon, the United States Nuclear Regulatory Commission requires that a reactor vessel be removed from service when embrittlement reaches a predetermined stage, thus ending the useful life of this portion of the nuclear power plant. Replacement of such a vessel is extremely expensive because the vessel is built into and is a part of the reactor containment building, thereby making replacement economically impractical.

In order to deal with this problem, it has been proposed to subject such a vessel to annealing in place in order to restore the ductility and toughness of the metal constituting the reactor vessel.

In order for such an annealing treatment to be successful, the vessel wall must be heated to defined temperatures, must be precisely maintained at each defined temperature for a predetermined period of time, and must undergo temperature changes at a controlled rate. Because of the size of a reactor vessel and in view of the relatively high temperatures employed for such an annealing treatment, heating of the vessel wall involves a number of variables and uncertainties which must be taken into account when making heater power adjustments. In particular, there are inherent delays between any change in heater power and the resulting change in the temperature of the vessel wall and the heat produced by any one heater can influence the vessel in a manner which is not completely predictable.

SUMMARY OF THE INVENTION

It is a primary object of the present invention to control such an annealing treatment in a manner to maintain precise control of the temperatures of all zones of the body being treated.

Another object of the invention is to effect heating control in a manner which compensates for the inherent delays between changes in heater power and corresponding changes in the temperature of the body being treated.

Yet another object of the invention is to assure full operator control over the heating process.

A still further object of the invention is to eliminate the adverse effects on the control process of extraneous variations in surface temperature readings employed for the control procedure.

A still further object of the invention is to eliminate instabilities in the heating process, and in particular to prevent oscillatory variations in the heater power output.

The above and other objects are achieved, according to the present invention, by a process for controlling the heating of a thin-walled body according to a predetermined temperature program by means of electrically controllable heaters, comprising:

disposing the heaters adjacent one surface of the body such that each heater is in facing relation with a respective zone of the surface;

supplying heat-generating power to each heater and monitoring the temperature at each surface zone;

deriving, on the basis of the temperature values obtained in the monitoring step, estimated values of the temperature, THSI, of each zone of the surface at successive regular time intervals having a first selected duration;

generating, on the basis of the estimated temperature values derived in each time interval and for each zone, representations of the temperature, THSIFUT, which each surface zone will have, based on the level of power presently supplied to each heater, at a future time which is separated from the present time interval by a second selected duration;

determining, for each zone, the difference between THSIFUT and the desired temperature, FUTREFTVZL, at the future time which is separated from the present time interval by the second selected duration;

providing, for each zone, a representation indicating the power which should be supplied to each heater in order to reduce the difference obtained in the determining step; and adjusting the power supplied to each heater by the supplying step in response to the value of the representation provided in the providing step for each zone.

DESCRIPTION OF THE PREFERRED EMBODIMENTS

The following is a definition of terms employed in the description of a process according to the present invention:

j—specific vessel zone; j may have any value between1 and N, where N is the total number of vessel zones, usually corresponding to the total number of heater units THCP(j)—heat capacity of vessel zone j in BTU/°F.

POWMAX(j)—heater power in BTU/hr corresponding to 100% demand

TAU1—time period following a power change in a given vessel zone during which additional power changes in the same zone are inhibited TAU2(j)—time increment for calculating future vessel zone temperature values upon which recommended power change decisions are based, independently selectable for each heater zone TAU3—temperature filter time constant; the temperature signal filter will be a digital implementation of a double pole filter having response characteristics corresponding to the following analog filter representation:

$$\frac{1}{(1 + \tau s)^2}$$

TAU4—rate lag unit time constant; the 'filtered rate' signal equation will be a digital implementation of a rate lag compensation having response characteristics corresponding to the following analog form:

$$\frac{\tau s}{1 + \tau s}$$

GAIN(j)—gain factor for fine tuning of PDEL vs. TDEL relation

PDELMIN—minimum power threshold used for checking power changes

PDBND(j)—deadband on recommended heater power change

TRNI(j)—Nominal target temperature value

TRUI(j)—Upper limiting target temperature value

TRLI(j)—Lower limiting target temperature value

FUTREFTVZL(j)—future nominal target temperature value TAU2(j) hours from the current time THSI(j)—Calculated best estimate vessel surface temperature RHSI(j)—Calculated best estimate vessel surface temperature rate PHII(j)—Current input power demand to heater zones. This parameter must be the actual power demand to the heater power controllers as forwarded/acknowledged by the operator, not the actual measured heater power nor the recommended heater power.

PDEMREC(j)—Recommended individual zone heater power demand

PDEL(j)—Recommended change in individual zone heater powder

TRACKSTATUS—Control algorithm in 'tracking' mode due to power cutback or abort

THSIOLD(j)—first past value of THSI(j)

FILTHSI(j)—filtered THSI(j) (first stage of 2 pole filter)

FILTHSIOLD(j)—first past value of filtered THSI(j)—(first stage of 2 pole filter)

FIL2THSI(j)—filtered FILTHSI(j) (second stage of 2 pole filter)

FIL2THSIOLD(j)—first past value of filtered FILTHSI(j)—(second stage of 2 pole filter)

FILTRATE(j)—rate lag compensated FIL2THSI(j) (i.e., filtered temperature rate)

FILTRATEOLD(j)—first past value of FILTRATE(j)

PHIIOLD(j)—first past value of PHII(j), current input heater power demand

TELAPSE(j)—elapsed time since the last change in actual heater power demand in a given zone FACTOR(j)—weighting factor on PDEL(j) based on TELAPSE(j)

THSIFUT(j)—projected vessel zone temperature TAU2(j) hours from the current time TERRFUT(j)—projected deviation of projected actual vessel zone temperature THSIFUT(j) from the nominal target temperature value FUTREFTVZL(j) at a time TAU2(j) hours from the current time TDEL(j)—vessel zone temperature deviation upon which recommended heater zone power change is calculated DT—the time separating successive processing cycles.

The parameters with the suffix OLD(j) are the values obtained during the preceding processing cycle.

The control process according to the present invention can be applied to the annealing system described in the above-cited application Ser. No. 368,456.

Figure 1:
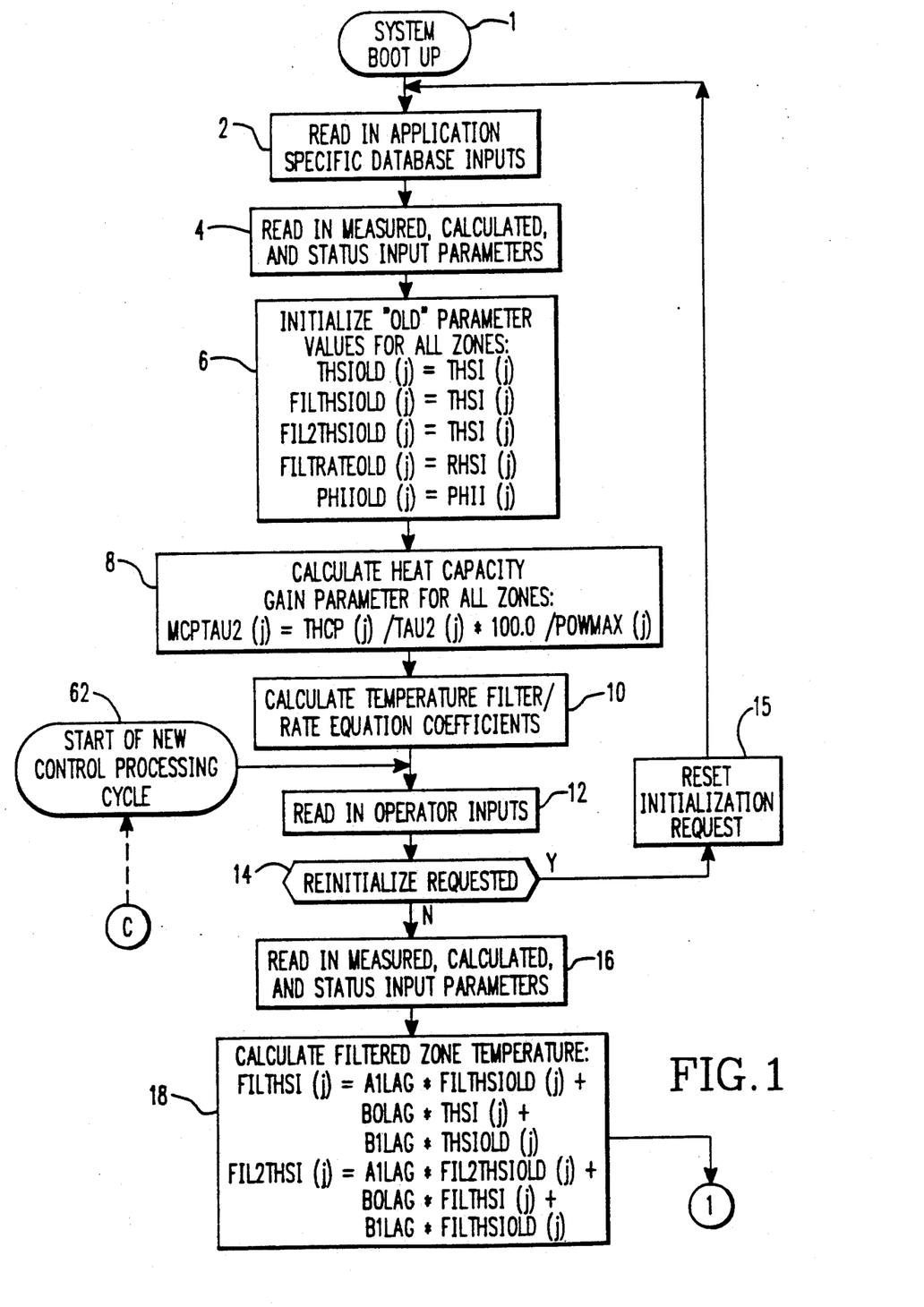
FIGS. 1-4 are flow diagrams of portions of a control process according to a preferred embodiment of the present invention.

Referring now to FIG. 1, upon system boot up in step 1, process step 2 is executed to input values for the following parameters from a previously established data base:

EMAX, which is the maximum control temperature error limit;

EMIN, which is the minimum control temperature error limit;

THCP(j); POWMAX(j); TAU1; TAU2(j); TAU3; TAU4; GAIN(j); PDELMIN; and PDBND(j), all of which have been defined above.

Then, in process step 4, values for a number of treatment parameters are inputted from a cooperating system which is configured to define the manner in which the vessel temperature is to be varied during a complete annealing treatment and the range over which the desired, or nominal target, temperature can vary during each phase of the treatment. In addition, the cooperating system receives data from all of the vessel temperature monitoring thermocouples and readings of the input power demand currently supplied by the operator to the heater power controllers and carries out straightforward calculations to produce estimates of the current temperature and temperature variation rate at each vessel zone j. The temperature calculation could be carried on the basis of readings provided by systems as disclosed in the above-cited copending U.S. application Ser. NO. 368,432 and in a manner described in the, above-cited copending U.S. application Ser. No. 368,453. The initial temperature variation rate RHSI(j) could be obtained by a time derivative operation or an equivalent digital calculation. The parameter values input at process step 4 are: TRNI(j); TRUI(j); TRLI(j); FUTREFTVZL(j); THSI(j); RHSI(j); and PHII(j), all of which have been defined above..

In process step 6, certain parameter values required for subsequent processing are initialized. Specifically, the following initialization is performed for each zone j:
THSIOLD(j)=THSI(j)
FILTHSIOLD(j)=THSI(j)
FIL2THSIOLD(j)=THSI(j)
FILTRATEOLD(j)=RHSI(j), normally equal to 0
PHIIOLD(j)=PHII(j)

In other words, the initial temperature values are set on the assumption that a constant temperature state existed just prior to initiation of the control process.

In process step 8, a heat capacity gain factor is calculated on the basis of the following equation:

$$MCPTAU2(j)=(THCP(j)/TAU2(j))\cdot(100/POWMAX(j)),$$

where THCP(j) is the heat capacity value for zone j in BTU/°F. Values for THCP(j) are independently derived prior to an annealing treatment and it is presently considered that the value for each zone j will be in the range of 74 to 218.5;

TAU2(j) is defined above and its unit is hours; and
POWMAX(j) is the heater power available at zone j, in BTU/Hr, at 100% demand.

Thus, MCPTAU2(j) represents the percentage of maximum heater power required at zone j during time TAU2(j) for each 1° F. change in the temperature of vessel zone j.

Then, in process step 10 temperature filter and filtered temperature rate coefficients are calculated as for the temperature filter coefficients:

$$A1LAG=exp(-DT/TAU3)$$

$$B0LAG=B1LAG=(1-A1LAG)/2$$

for the filtered temperature rate coefficients:

$$A1RLAG=exp(-DT/TAU4)$$

$$B0RLAG=-B1RLAG=(1-A1RLAG)/DT$$

where DT is the time since the last processing cycle, in hours.

In process step 12, various commands available to the operator can be input. One example of such a command is identified by the notation REQREINIT—which is a request for reinitialization of the control process based on new treatment specific data base inputs.

Thereafter, in decision step 14, an inquiry is made as to whether the operator inputted such a command, in which case, the process returns via step 15 to step 2.

Otherwise, the process proceeds to process step 16, where all of the parameters inputted in process step 4 are reintroduced. The process now has available a set of measured or calculated temperature, temperature rate and current input power demand parameters, along with a set of parameters having variable names bearing the suffix OLD(j).

Then, in process step 18, the following calculations are performed, these calculations being performed in order to derive values for FILTHSI(j) and FIL2THSI(j) for each zone j:

$$FILTHSI(j)\\ A1LAG*FILTHSIOLD(j)+B0LAG*THSI(j)+B1LAG*THSIOLD(j)$$

$$FIL2THSI(j)=A1LAG*FIL2THSIOLD(j)+B0LAG*FILTHSI(j)+B1LAG*FILTHSIOLD(j)$$

Figure 2:
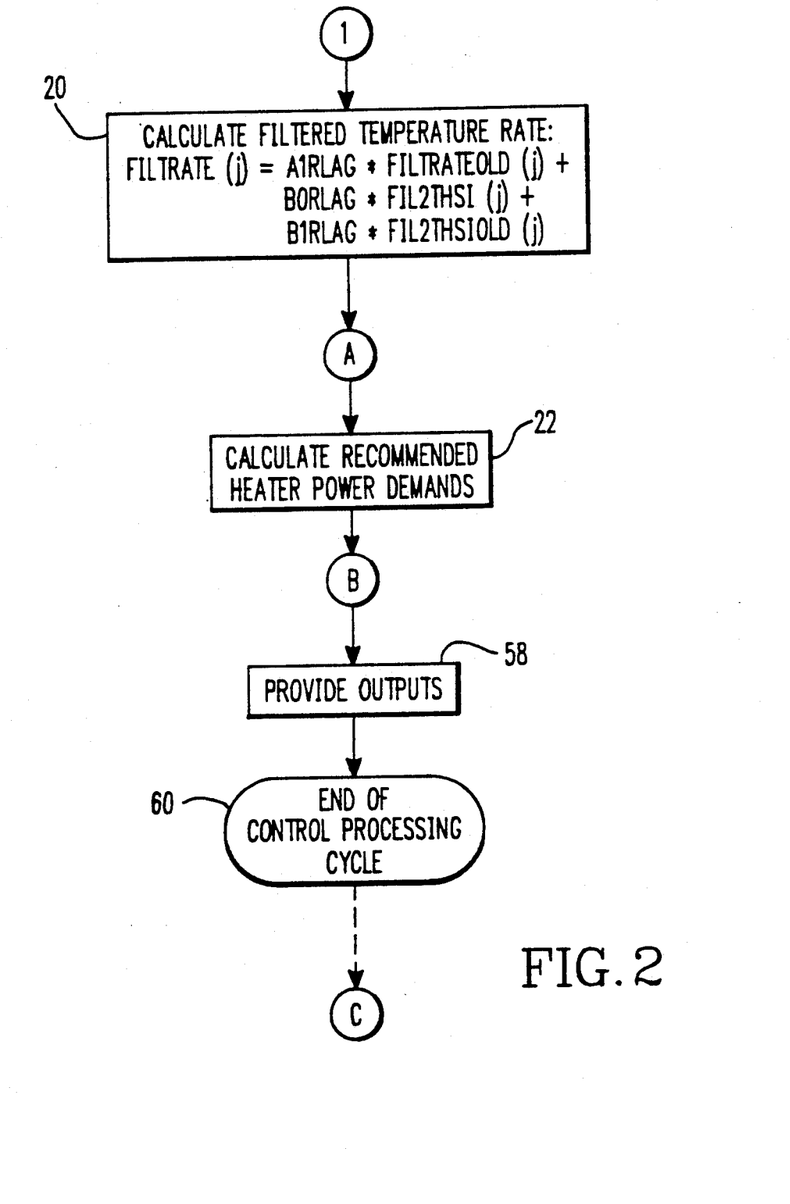

After these calculations are performed, the process continues in process step 20 shown in FIG. 2, where a filtered temperature rate is calculated as follows:

$$FILTRATE(j)\\ A1RLAG*FILTRATEOLD(j)+B0RLAG*FIL2THSI(j)+B1RLAG*FIL2THSIOLD(j).$$

Figure 3:
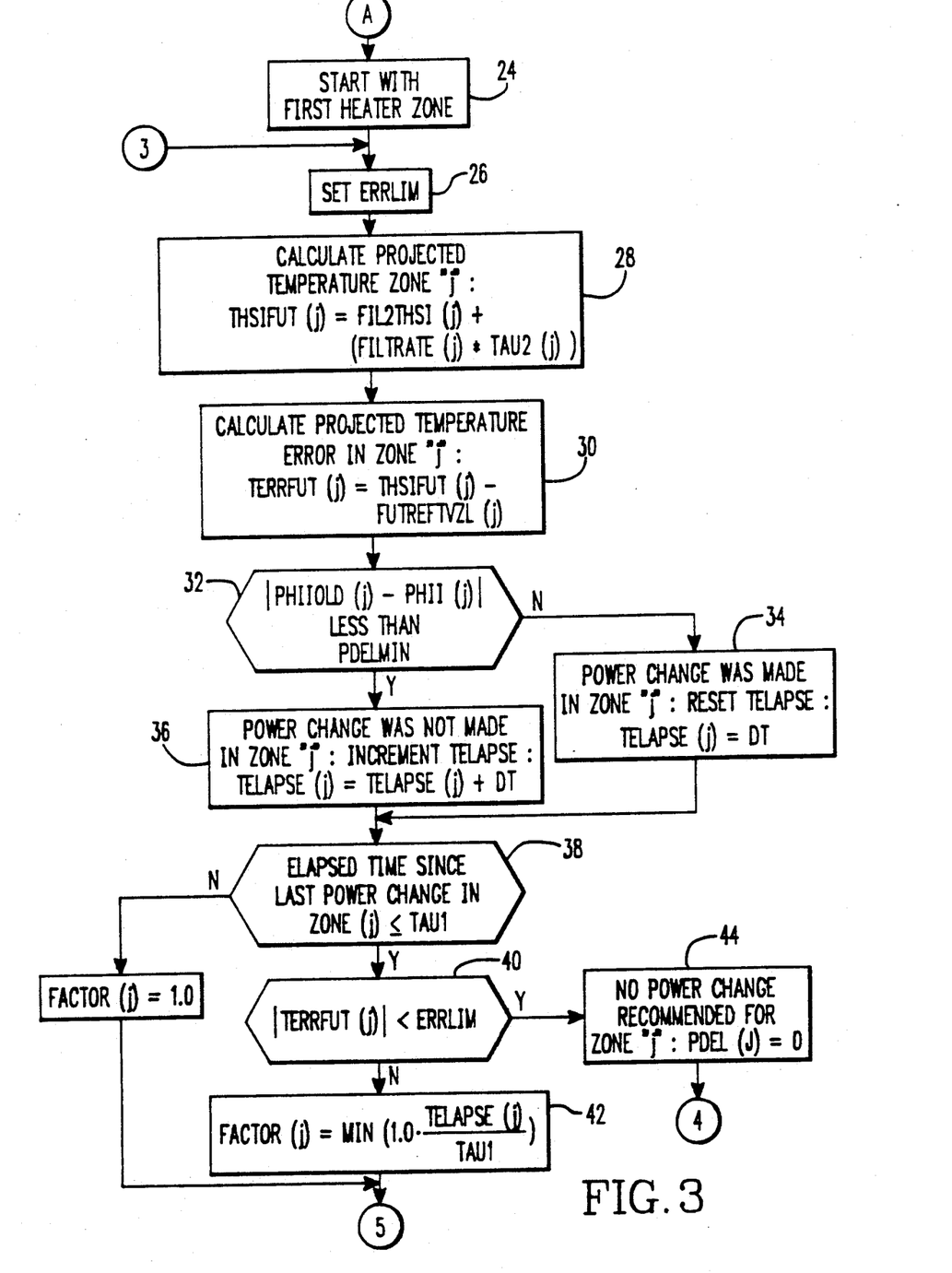
Figure 4:
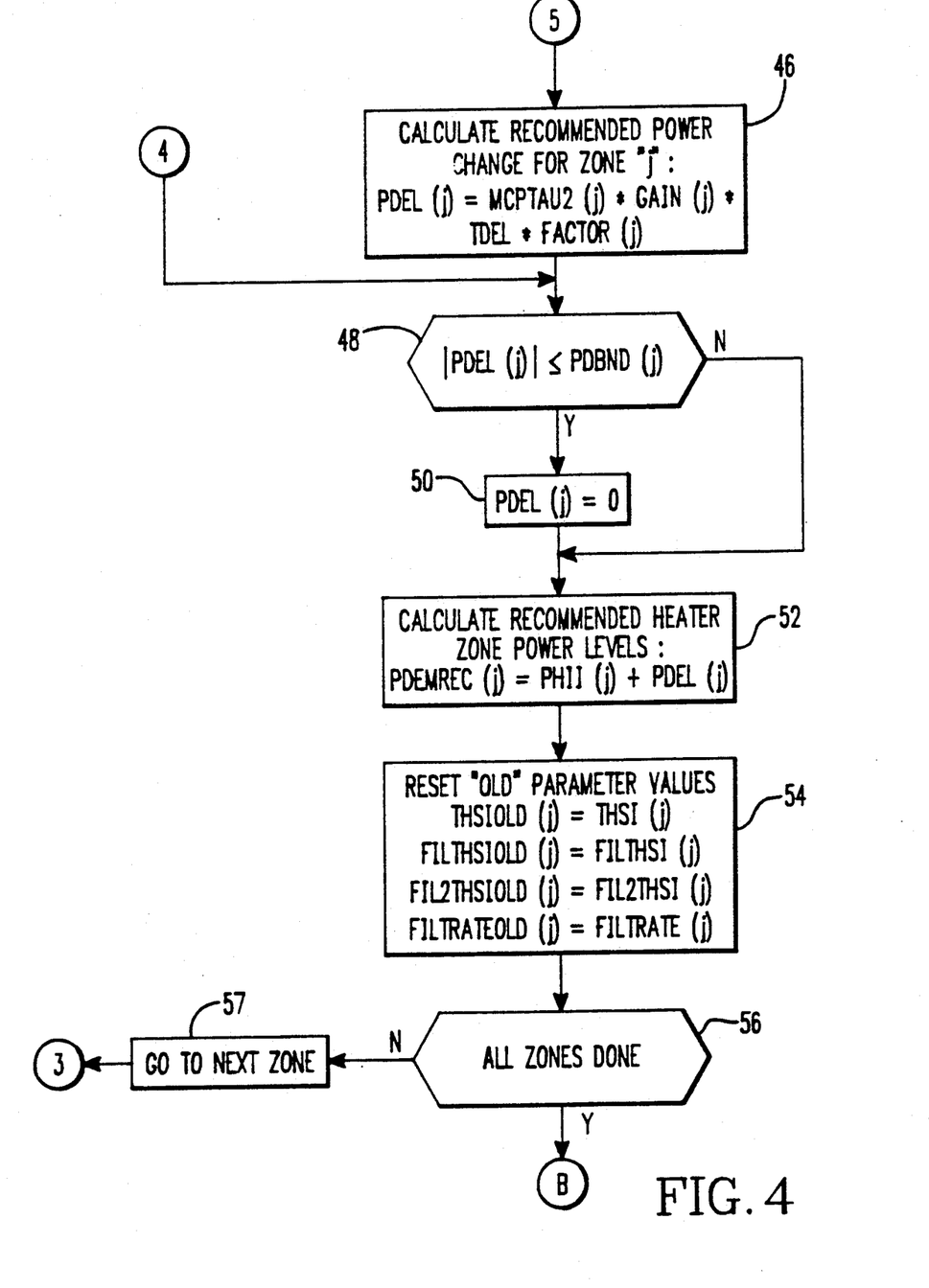

Then recommended heater power demands are calculated in process 22, which is shown detail in FIGS. 3 and 4.

In process step 24 shown in FIG. 3, the first heater zone is selected and then, in process step 6, a value is set for the parameter ERRLIM. This is determined as follows:

$$ERRLIM=MIN[EMAX, MAX [MIN [|TRUI(j)-TRNI(j)|, |TRNI(j)|], EMIN]].$$

where:

TRNI(j) is the nominal target temperature value for vessel zone j;

TRUI(j) is the upper limiting target temperature value for vessel zone j; and

TRLI(j) is the lower limiting target temperature value for vessel zone j.

EMAX and EMIN are provided in the data base from which data is taken to carry out the various control computations and are normally maintained constant during the annealing treatment. TRNI(j), TRUI(j) and TRLI(j) are supplied by the associated system or program which defines the goals of the treatment procedure.

EMAX provides a reasonable bound on temperature error for control correction purposes even though considerable deviation may be allowed based on stress considerations as reflected by TRUI(j) and TRLI(j). EMIN is provided so that excessively tight bounds do not result in oscillatory behavior or a continuous buildup of recommended power charges.

However, recent investigations have revealed that satisfactory control can be achieved if ERRLIM is set to a fixed value, which may be of the order of 10° F. in the type of treatment with which this embodiment is concerned.

If the temperature error in a given vessel zone is projected to exceed ERRLIM, and the lapsed time since the most recent power change in the same zone is less than TAU1, additional recommended power charges are provided but are weighted by a coefficient, FACTOR(j), equal to the ratio of the time elapsed since the most recent change, TELAPSE(j), and TAU1.

Then, in process step 28, the projected temperature THSIFUT(j) in each zone at a time TAU2(j) after the present time is calculated based on the present filtered values for the respective zone temperature and rate of temperature change as follows:

$$THSIFUT(j) = FIL2THSI(j) + (FILTRATE(j) \cdot TAU2(j)).$$

On the basis of the value derived for each zone, there is calculated, in process step 30, the projected temperature error TERRFUT(j), for each zone, where:

$$TERRFUT(j) = THSIFUT(j) - FUTREFTVZL(j).$$

The operations performed in process steps 28 and 30 represent a departure from conventional temperature control practice, where heater power settings are determined on the basis of past temperature variations rather than on projected future temperature values.

Then, in decision step 32, a determination is made of whether the difference between the present value and the first past value of PHII(j), the input power demand to the respective heater zone, is greater or less than PDELMIN, the value of which is stored in a data base used in the performance of the process. If the difference is greater than the minimum power threshold, it is indicated, in process step 34, that a power change was made, and the variable TELAPSE(j) is reset to indicate one unit of DT.

If, on the other hand, the result of the comparison made in process step 32 is true, the conclusion is reached, in process step 36, that a power change was not made in the respective zone and the present value of TELAPSE(j) is incremented by one unit of DT.

Then, in decision step 38, a determination is made whether the value of TELAPSE(j) is less than or equal to TAU1, which is the power change inhibition interval. If the result produces a "no" response, the variable FACTOR(j) is set to a value of 1. If the response is "yes" this signifies that, normally, a further change in heater power demand should not be made. This operation represents a further significant feature of the invention and is based on applicants' recognition that the inherent time delays in heat treatment procedures between a heater power change and the resulting change in the temperature of the body being heated are such that frequent changes in heater output power can lead to unpredictable and uncontrollable temperature variations. By imposing a constraint on the frequency with which a change in recommended heater power is made, it has been found that a considerable improvement in control of the resulting vessel wall temperature can be achieved.

However, there can be situations where the projected temperature error will be unacceptably larger than the desired nominal temperature at the selected future time. The present invention makes allowance for this eventuality by the operations performed in process steps 40 and 42. In process step 40, a determination is made of whether the absolute value of TERRFUT(j) is less than ERRLIM. If it is not, then a value is assigned to the variable FACTOR(j) which is equal to TELAPSE(j)/TAU1. This factor, which is derived in process step 42, is then used to reduce the subsequently derived recommended power change. If the result of the comparison in process step 40 is "yes", then this is interpreted, in process step 44, as an indication that no power change should be recommended for the respective zone.

Referring now to FIG. 4, if an output is produced by process step 42, then a recommended power change is derived in process step 46 by the following calculation:

$$PDEL(j) = MCPTAU2(j) \cdot GAIN(j) \cdot TDEL(j) \cdot FACTOR(j)$$

For the calculation performed in process step 46, TDEL(j) is made equal to $(-TERRFUT(j))$.

Then, in decision step 48, it is determined whether the absolute value of PDEL(j), derived in step 46, is less than or equal to PDBND(j). If the answer is "yes", then, in process step 50, PDEL(j) is set equal to zero. This operation represents a further beneficial feature of the invention since, by preventing small changes in the recommended zone heater power change, undesirable fluctuations in the temperature of each vessel zone can be avoided, so that the heat treatment process will proceed in a more stable manner.

If the result of the comparison made in decision step 48 is "no", process step 50 is bypassed and then, in process step 52, a recommended heater zone power level PDEMREC(j) is calculated by adding the current actual power demand PHII(j) to the recommended power change PDEL(j).

Thereafter, in process step 54, the values which have been calculated for the best estimate of vessel surface temperature and vessel surface temperature rate, and the current input power demand for each zone are stored as the OLD(j) values to be used in the next process cycle.

Then, in decision step 56, an inquiry is made as to whether all zones have been processed and if not, processing returns via step 57 to process step 26. Otherwise, the process returns to process step 58 in FIG. 4 which provides and displays to the operator the values for PDEMREC(j), PDEL(j) and TRACKSTATUS, the latter providing information if a power cutback or treatment abort was necessary.

If a power cutback is initiated, for example because a temperature constraint has been exceeded, the process recognizes the power changes introduced during the cutback, resets the TELAPS(j) parameter, and continues to provide power recommendations in the usual manner. The operator can override the cutback and place the system in a RECOVERY mode. He can then input, to the system supplying information to the process, a desired rate of temperature change equal to zero along with a steady state target temperature close to the current vessel average surface temperature. After the cutback override is reset, the process according to the present invention will provide power change recommendations in order to help reestablish an equilibrium, steady state vessel surface temperature in all zones corresponding to the input reference. Once this is reached and all constraint violations have been eliminated, the operator can input a new desired rate of temperature change and endpoint and resume the treatment process.

After the process performed in step 58, the end of a processing cycle is indicated, in process step 60, and operation returns to a processing step 62 (FIG. 1) which initiates a new processing cycle.

The use of predicted temperature and temperature rate values according to the present invention serves beneficially to deal with the delays inherent in heating a body, such as a reactor vessel, to a defined temperature and essentially provides an action analogous to the reset time constant in the integral term of a P-I controller.

The use of a projected error has the advantage that with a known, desired temperature trajectory, a degree of anticipation can be provided which is not available with the classic P-I compensation using only the current temperature error.

The process according to the present invention is self-correcting in that if a recommended power change proves to be insufficient to correct the temperature error, the process recommends an additional incremental power change.

To insure flexibility of the process according to the invention, a capability is provided for specifying a value of TAU2 individually for each vessel zone. However, it is believed that a fixed value for TAU2 can be satisfactorily employed for all vessel zones.

It will be noted that the equation relating PDEL(j) to TDEL(j) in process step 46 is a linear one. This is based on studies which have revealed that such a relationship provides a satisfactory control with a relatively simple calculation. The additional gain factor GAIN(j) is provided as part of the PDEL(j) equation to take account of the fact that the TDEL(j) value resulting TAU2(j) hours after a given PDEL(j) step change is not actually the final steady state change in temperature expected for the power change which was made but that, in reality, the temperature change will continue and will either overshoot or undershoot the projected TDEL(j) value. By providing a value for GAIN(j), which is less than one, this effect is damped, thereby avoiding the potential for oscillatory PDEL(j) recommendations which would cause temperature changes to alternatingly overshoot and undershoot the desired value. Reducing the GAIN value slows the response and lessens the overshoot and oscillatory behavior. The gain factor also indirectly addresses delays in the system and the fact that only a fraction of the heater power in a given zone actually reaches the vessel wall for that zone. Appropriate zone specific gain values can be determined based on response evaluations made using an analytical model. A suitable array of gain values can be provided as part of the data base used to carry out the process. These gain values will also be available to the operator to provide a convenient method for fine tuning the control process for individual zones during actual performance of an annealing treatment.

It will be noted from function blocks 18, 20 and 28 that the calculation of the future temperature for each zone is based on filtered temperature and temperature rate values. The filtering employed according to the present invention constitutes a double pole filtering and serves to eliminate noise in the vessel surface temperature signals due to errors introduced into the analog/digital conversion as a result of process, instrumentation or quantization errors. A double pole filter is utilized so that relatively high noise rejection can be achieved without introducing extreme sluggishness into the temperature signal utilized for control. It will be appreciated that as TAU3 becomes larger, high frequency noise rejection increases, but temperature signal response becomes slower since the output of the filter increasingly dependent on past values. The value TAU3 will be selected to provide as much noise rejection as possible without impacting on overall control performance. TAU4 represents the time constant for the rate lag compensation applied to the filtered temperature signal in order to generate an approximation of temperature rate of change. The output of a rate lag compensation for an input time-varying signal is essentially the derivative of the input signal filtered by a single pole filter having the specified constant, i.e., a filtered rate signal. A rate lag compensation is utilized in place of a direct derivative calculation because derivatives tend to be very noise sensitive. The filtering characteristic of the rate lag minimizes this sensitivity while providing a relatively responsive rate signal. The larger TAU4 becomes, the smoother and less responsive the rate signal becomes. The value for TAU4 will be selected on the basis of the same criterion as that described above for selecting TAU3.

According to an exemplary embodiment of the invention, the following parameters could have the stated values:
TAU1 = 15 Minutes;
TAU2(j) = 0.5–2 Hours;
TAU3 = 2 Minutes;
TAU4 = 15 Minutes;
PDBND(j) = 1 percent of rated power;
GAIN(j) = 0.1–0.5.

At any time during a heating operation, the operator can re-initialize the control process, including all values in the database, from the process described in the above-cited copending application Ser. No. 368,453.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A process for controlling the heating of a thin-walled body according to a predetermined temperature program by means of electrically controllable heaters, comprising:
   disposing the heaters adjacent one surface of the body such that each heater is in facing relation with a respective zone of the surface;
   supplying heat-generating power to each heater and monitoring the temperature at each surface zone;
   deriving, on the basis of the temperature values obtained in said monitoring step, estimated temperature values of each zone of the surface at successive time intervals each having a first selected duration;
   generating, on the basis of the estimated temperature values derived in each time interval and for each zone, representations of the temperature, THSIFUT, which each surface zone will have, based on the level of power presently supplied to each heater, at a future time which is separated from the present time interval by a second selected duration;
   determining, for each zone, the difference between THSIFUT and the desired temperature, FUTREFTVZL, at the future time which is separated from the present time interval by the second selected duration;
   providing, for each zone, a representation indicating the power level which should be supplied to each heater in order to reduce the difference obtained in said determining step; and adjusting the power level supplied to each heater by said supplying step in response to the value of the representation provided in said providing step for each zone.

2. A process as defined in claim 1 wherein said step of adjusting is carried out by an operator based on a reading of the value of the representation provided in said providing step for each zone.

3. A process as defined in claim 1 wherein said step of deriving comprises filtering the temperature values obtained in said monitoring step to eliminate the effects of extraneous fluctuations in the temperature values obtained in said monitoring step.

4. A process as defined in claim 1 wherein said step of providing comprises inhibiting any change in the value of the power which should be supplied to a given zone for a period having a third selected duration after each change in that value, when the difference obtained in said determining step for the given zone is less than a selected error limit value.

5. A process as defined in claim 1 wherein said step of providing comprises calculating the power level change required to bring the difference between THSIFUT and FUTREFTVZL to zero, and giving the representation indicating the power level which should be supplied a value equal to the sum of the power level presently supplied to the heater and a fraction of the calculated power level change.

6. A process as defined in claim 1 wherein said step of deriving further comprises deriving estimated rate of temperature change values of each zone of the surface of successive time intervals each having the first selected duration.

7. A process as defined in claim 1 wherein the thin-walled body is a reactor vessel.

8. A process as defined in claim 2 wherein said step of deriving comprises filtering the temperature values obtained in said monitoring step to eliminate the effects of extraneous fluctuations in the temperature values obtained in said monitoring step.

9. A process as defined in claim 3 wherein said step of filtering comprises averaging successive temperature values obtained in said monitoring step for each zone.

10. A process as defined in claim 4 wherein said step of providing further comprises providing a modified representation corresponding to the difference obtained in said determining step multiplied by a factor proportional to the time elapsed since the previous change in the value of the power which should be supplied to a given zone divided by the third selected duration, during each period having the third selected duration after each change when the difference obtained in said determining step for the given zone is not less than the selected error limit value.

11. A process as defined in claim 8 wherein said step of filtering comprises averaging successive temperature value obtained in said monitoring step for each zone.

12. A process as defined in claim 9 wherein said step of providing comprises inhibiting any change in the value of the power which should be supplied to a given zone for a period having a third selected duration after each change in that value, when the difference obtained in said determining step for the given zone is less than a selected error limit value.

13. A process as defined in claim 10 wherein said step of providing further comprises calculating the power level change required to bring the difference between THSIFUT and FUTREFTVZL to zero, and giving the representation indicating the power level which should be supplied a value equal to the sum of the power level presently supplied to the heater and a fraction of the calculated power level change.

14. A process as defined in claim 12 wherein said step of providing further comprises providing a modified representation corresponding to the difference obtained in said determining step multiplied by a factor proportional to the time elapsed since the previous change in the value of the power which should be supplied to a given zone divided by the third selected duration, during each period having the third selected duration after each change when the difference obtained in said determining step for the given zone is not less than the selected error limit value.

15. A process as defined in claim 14 wherein said step of providing further comprises calculating the power level change required to bring the difference between THSIFUT and FUTREFTVZL to zero, and giving the representation indicating the power level which should be supplied a value equal to the sum of the power level presently supplied to the heater and a fraction of the calculated power level change.

* * * * *